United States Patent
Szymanski et al.

[11] Patent Number: 5,484,757
[45] Date of Patent: Jan. 16, 1996

[54] TITANIA-BASED CATALYST CARRIERS

[75] Inventors: Thomas Szymanski, Hudson; Steven A. Rolando, Silver Lake; David M. Gough, Tallmadge; Gerald S. Bennett, Cuyahoga Falls, all of Ohio

[73] Assignee: Norton Chemical Process Products Corp., Stow, Ohio

[21] Appl. No.: 252,806

[22] Filed: Jun. 2, 1994

[51] Int. Cl.$^6$ .............................. B01J 21/06; B01J 32/00
[52] U.S. Cl. ............................................. 502/439; 502/350
[58] Field of Search ........................... 502/242, 439, 502/503, 504, 208, 350

[56] References Cited

U.S. PATENT DOCUMENTS 4,410,448  10/1983  Shaw et al. ........................ 502/159
5,100,858   3/1992  Chopin et al. ...................... 502/350

*Primary Examiner*—Shrive Beck
*Assistant Examiner*—Fred J. Parker
*Attorney, Agent, or Firm*—David Bennett

[57] ABSTRACT

Advantageous titania based catalyst carriers for use in applications requiring a balance of surface area and crush strength can be obtained by using as the starting material a titania hydrate pulp with a surface area above about 200 m$^2$/g and an LOI of from about 15% to about 40% by weight.

12 Claims, 2 Drawing Sheets

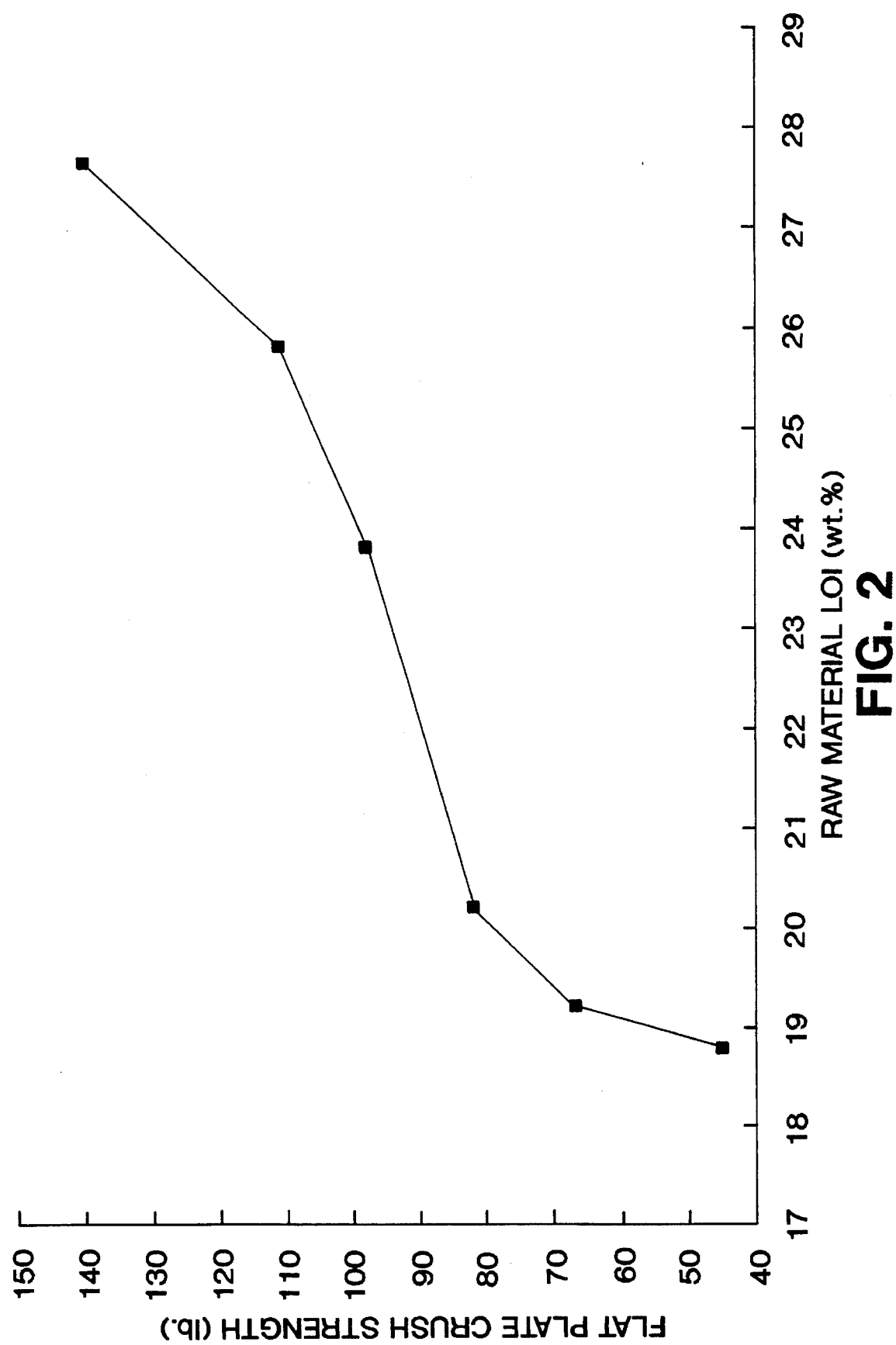

TITANIA-BASED CATALYST CARRIERS

BACKGROUND OF THE INVENTION

This invention relates to catalyst carriers based on titania and particularly to carriers that can be used to make catalyst particles that are particularly useful in hydrocarbon conversion processes.

Titanium dioxide, (titania), is commonly obtained from raw materials such as ilmenite ore or "titanium slag" (residue after extraction of titanium), by either the chloride process or the sulfate process. In the chloride process the raw material is reacted with chlorine to yield titanium tetrachloride which is then burned to give titanium dioxide. The product can be obtained as very uniform excellent quality rutile or a quite adequate anatase or mixtures of these phases and with a BET surface area of anything from 8 to about 60 $m^2/gm$.

The alternative route involves digestion of the titania-containing raw material in sulfuric acid and separating from the mixture a solution of a titanium sulfate which is then hydrolyzed to give titanic acid with some associated sulfuric acid. Yet another process involves the acid hydrolysis of titanium tetrachloride to give titanic acid with associated residual acid. The product obtained by such acid hydrolytic processes is commonly referred to as "hydrate pulp". Calcination of this hydrate pulp can yield good quality anatase or rutile forms with surface areas of from 1 to 16 $m^2/gm$. This hydrate pulp has a surface area that is typically more than about 200 $m^2/gm$.

Titania based carriers are widely used to support catalyst compositions that are to be exposed to elevated temperatures in use The carriers can have "high", "low" or "intermediate" surface areas depending on the application. In the context of such applications "low" means a surface area of below about 10 $m^2/g$ for example less than about 8 $m^2/g$; "intermediate" means a surface area of about 10 to 100 $m^2/g$, for example from about 15 to about 95 $m^2/g$; and "high" means over about 100 $m^2/g$.

The specific application to which such carriers can be put is very wide including the catalytic formation of amines as taught for example in U.S. Pat. No. 5,225,600; diesel engine exhaust gas purification as disclosed in U.S. Pat. No. 5,208,203; decomposition of organic peroxides to from alcohols using the process of U.S. Pat. No. 4,547,598; removal of peroxide contaminants from alcohol product streams according to the process of U.S. Pat. No. 5,185,480; and in the Fischer-Tropsch process as set out in U.S. Pat. No. 5,169,821. Many of these applications prefer the use of high, (often very high), surface area catalyst supports. It is found however that such supports have little mechanical strength or attrition resistance.

The present invention concerns titania supports for example those intended for use in applications where attrition resistance is very important. These are applications in which the titania is in the form of pellets or extruded shaped particles designed to have a large geometrical surface area, an intermediate or even low BET surface area and, importantly, excellent attrition resistance enabling the catalyst to be used in situations in which the carrier particles can be expected to be subject to abrasive contact with adjacent particles and to substantial compressive forces under the conditions of use, that is, applications requiring particles with high crush strength.

The primary applications for such carriers is therefore in the area commonly referred to as "low" and "intermediate" surface area catalysts though they may also be useful in high surface area catalyst applications.

There is however a problem with obtaining a titania-based carrier that has adequate strength to withstand an environment in which a significant amount of crush strength is required. In a tower packed with extruded catalyst bearing carrier particles those at the bottom of the tower must withstand significant compressive forces.

Carrier materials are commonly produced by mixing a titania powder with a temporary binder formulation until an extrudable paste is formed, then forming the paste into the desired shape, drying the shape and firing to burn out the temporary binder and to convert the titania to a solid stable material. The titania carrier can be obtained in the shape of pellets, (as a result of extruding a continuous rod and then cutting the rod into pellets of the desired size), or it may be in the form of a large honeycomb monoliths, or it may be in individual relatively small, ring-based shaped structures of any desired configuration such as "wagon wheels" or any other extruded shapes with constant cross-sections such as for example multi-lobed structures and small honeycombs.

The higher the temperature to which the titania is fired, the more the structure is sintered and the stronger and more attrition-resistant it becomes. Unfortunately this is also accompanied by a reduction in surface area. As the temperature of sintering rises titania changes phase from the amorphous phase to the anatase form. Then above about 800° C. it begins to transform to the rutile form. The actual transformation temperature may be affected by the presence of impurities but it is generally complete by about 950° C. Increased levels of sintering are accompanied by a reduction in the surface area until a carrier that started off as being a "high" surface area carrier comes to be classed as "low". Indeed heating for too long a period at too high a temperature can result in the material losing any practical utility as a carrier. A useful carrier must also have sufficient porosity to carry catalytic amounts of a metal.

For many applications in which a very high surface area is preferred, the compressive strength is less important. If for example the carrier is in the form of a ceramic honeycomb monolith it is subjected to little in the way of compressive forces or attrition. For such applications the very high BET surface areas available with a lightly fired anatase support is quite suitable.

There is however also a need for a carrier with an adequately high surface area while maintaining a high level of attrition resistance and strength making it adaptable for very demanding catalytic applications.

The novel process of the present invention yields a carrier having properties that are not dependent only on the primary particle size of the starting material but also on the amount of volatilizable material it contains.

SUMMARY OF THE INVENTION

The present invention provides a process for making a titania catalyst carrier which comprises:

a) forming a mixture of titania hydrate pulp having a surface area of at least 150 $m^2/gm$, more preferably at least 200 $m^2/gm$, and most preferably of at least $250^2$/gm, and a loss-on-ignition of from about 15 to about 40%, with from about 1 to about 8% by weight, based on the equivalent dry titania weight, of an acid;

b) shaping the mixture in a desired ceramic shape; and thereafter c) firing the shaped mixture to form a product with a surface area of less than about 200 m²/gm.

The specific surface area is measured (after heating the sample to about 250° C.) by the BET technique that is well described in the art. The LOI is estimated by measuring the difference in weight between the starting material and the weight after exposure to a temperature of 1000° C. for a period of 30 minutes, expressed as a percentage of the initial weight. Abrasion Resistance is measured by the method described in ASTM D4058-92.

The discovery that both the surface area and the LOI of the starting material are critical in determining the strength and attrition resistance of the final product is quite surprising and not indicated by the prior art. Normally if a low to intermediate surface area support were to be targeted, it would be expected that a starting raw material selected from rutile or a rutile/anatase mixture would be selected. This is not however found to be effective method of obtaining a product combining good surface area and good mechanical properties.

Even more surprising is the discovery that the strength of the support is directly related to the LOI of the titania hydrate pulp starting material. It is believed that this may be connected to the ease with which the hydrate pulp can be peptized.

The material lost on ignition is primarily water but will also include residues and matter from the production process by which the titania was made. Where the sulfate process was used, some residual sulfate will be decomposed to liberate sulfur oxides. Since an LOI of from about 15 to about 40%, and preferably from about 24 to about 35% characterizes the starting materials, the hydrate pulps derived from the sulfate process, (which normally have such amounts of available water for loss upon ignition), are the preferred starting materials. Similar suitable hydrate pulps could in theory be prepared from titanium tetrachloride. While such hydrate pulps could conceivably be used, they are not commonly available.

It is found that, for mixtures with low to moderate surface areas and excellent physical properties, conventional mixing techniques are quite satisfactory. However if the carrier to be produced has a moderate to high surface area, the manner of compounding often affects the result. For example, the strongest products are obtained if the acid is allowed to peptize the hydrate pulp before any organic binders such as starch are added. The time taken to reach full peptization will depend on the compounding conditions but in general, under high shear conditions, at least five minutes are required to allow the hydrate to become fully peptized. When sufficient peptization has occurred, the material in the mixer changes from a wet powder to a slurry-like paste.

The strength of the acid can also have an impact on the product obtained. As set forth above, if low to moderate surface area carriers are desired, then the components can be mixed using conventional techniques and in such cases either strong or weak acids can be employed.

Since the stronger acids such as nitric acid decompose during firing to yield environmentally undesirable gases, appropriate safety measures must be taken. Thus if weaker acids such as formic acid can equally well perform the task, they will be preferred. If however a moderate to high surface area product is required and the mixing technique described above is employed, then the acid used must be strong enough to bring about peptization of the titania. It is found that formic acid, at least in the quantities that might feasibly be used, does not peptize the titania to the point that it yields a product that is as durable on firing as is produced when peptization has occurred to the point that a slurry has formed. In such case the acid of choice is the stronger nitric acid, in spite of the environmental precautions that will need to be taken. Other acids could be used provided that they do not leave a residue in the carrier after the firing process or if the residue left in the carrier is not incompatible with the intended application or if the necessary environmental precautions are not unacceptable.

The present invention appears to give a very important improvement over prior art processes. In such cases excessive mixing often seems to correlate to a drop in surface area. This sometimes occurs after as little as ten minutes.

DRAWINGS

FIG. 2 is a graph of the flat plate crush strength against the LOI for pellets made from a titania hydrate pulp.

SPECIFIC DESCRIPTION OF THE INVENTION

Figure 1:
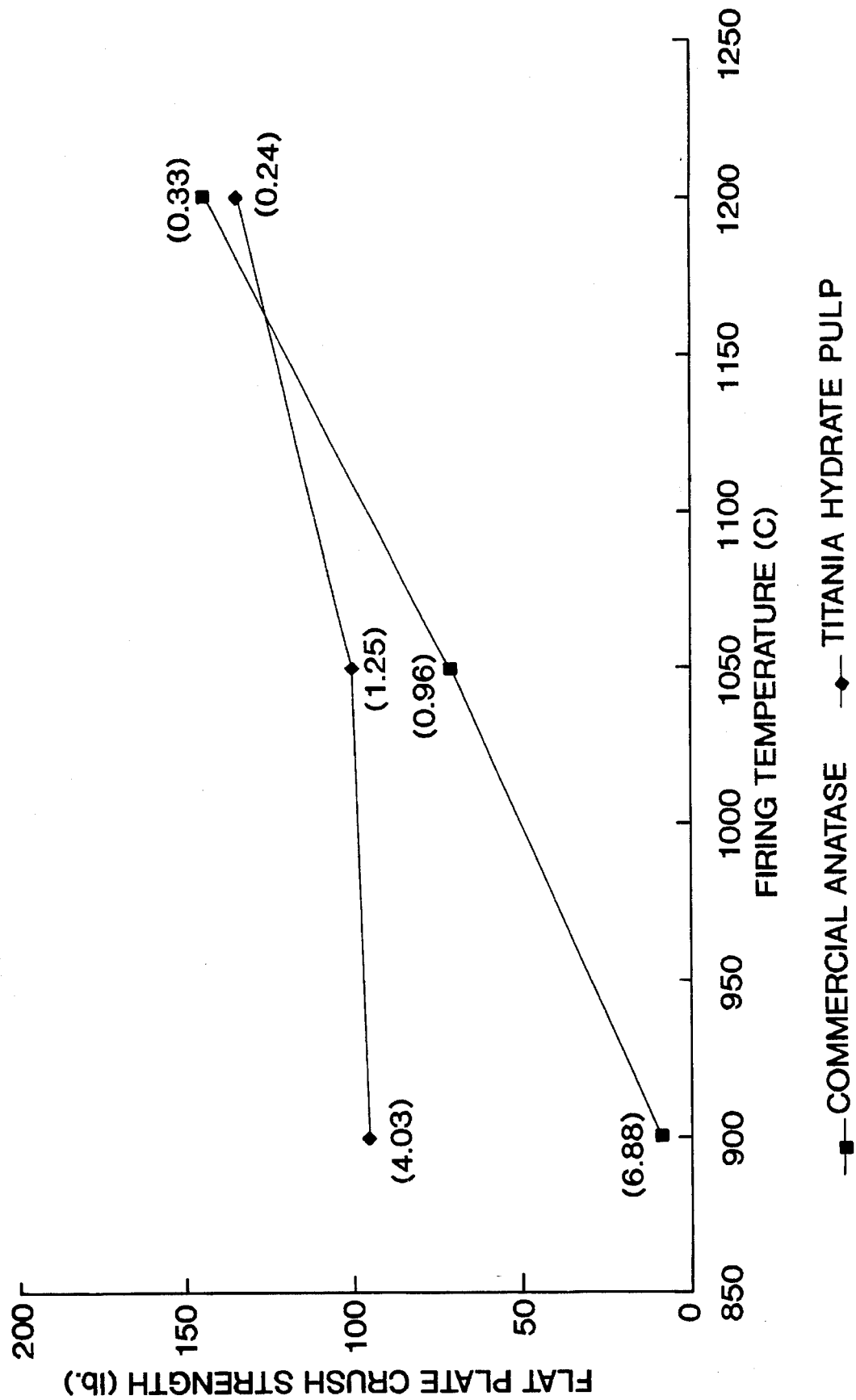
FIG. 1 is a graph showing the flat plate crush strength plotted against firing temperature for carrier pellets prepared from a commercial anatase and for pellets prepared from a commercial titania hydrate pulp.

The invention is further illustrated in the following evaluations which are for the purpose of illustration only and are not intended to imply any necessary limitation on the essential scope of the invention.

Example 1

Preparation of Catalyst Carrier Materials

A commercial pigment grade, additive-free anatase available from Kemira Inc. under the registered trademark Unitane 220 having a BET surface area of 14 m²/g was placed in a mixer with an organic binder and water. This mixture was compounded and extruded into rods with a diameter of 3.5 mm, The rods were cut into pellets with lengths ranging from about 1.5 mm to about 15 mm. This represents the prior art carriers.

A commercial sulfate process titania hydrate pulp available from Kemira Inc. under the registered trademark Uniti 908 having a BET surface area of >200 m²/g and a LOI 26%, was mixed with 2.9% by weight, based on the titania hydrate pulp weight, 70% formic acid, 1.5% by weight (based on the hydrate pulp weight) of starch and 28.4% of water based on the hydrate pulp weight. The mixture was then extruded into the form of pellets which were then fired. These represent carriers made according to the process of the invention, with a moderate to low surface area.

Evaluation of the Catalyst Pellets

The pellets from each of the preparations described above were fired at 900° C. and the flat plate crush strength was measured on a Compton Tensile Tester, model 50-OP, and the BET surface area was also measured using nitrogen or krypton as the absorbate.

Further samples were heated at 1050° C. and 1200° C. and further measurements of crush strength and BET surface area were made at each temperature. The results are shown in the graph identified as FIG. 1.

From the graph it can be seen that, while the pellets made from the commercial hydrate pulp had a comparable BET surface area after being fired at 900° C. to that of the Unit 908 pellets made from the anatase, the crush strength was very much greater. At the 1050° C. firing temperature the pellets from the hydrate pulp still had a high crush strength and had retained a markedly greater proportion of the surface area than had the product made from anatase. It is notable that although the prior art anatase-based product had increased significantly in crush strength, the product made from hydrate pulp had hardly changed in this respect. Thus from the viewpoint of the balance of crush strength and surface area, the hydrate pulp product can be obtained with a better crush strength and surface area balance than can the anatase-based product, and at a relatively low temperature.

The crush strength of the hydrate pulp-based pellets made from raw materials with different LOI values was then measured after each had been fired to the same temperature. The results are plotted on the graph appearing as FIG. 2. From this graph it can be seen that the crush strength starts low but increases rapidly till an LOI of about 20% is reached. Thereafter a more modest rate of increase is observed till about an LOI value of 25% is reached after which the crush strength increases rapidly again. However from FIG. 1 we are aware that the higher crush strengths are associated with a loss of surface area to a point at which the carriers have reduced utility. Thus the preferred carrier products produced by the process of the invention are made using a hydrate pulp with a LOI of from about 24% to about 35%.

Example 2

This Example shows the importance of the mixing technique described in the process of the invention. Two mixing techniques were used. In both cases the amount of both acid and starch additives was 4% of the hydrate pulp weight. Water represented 40–48% of the hydrate pulp weight. The acids used were nitric and formic acids. All samples were fired to the same calcination temperature of 350° C.

Technique A involved dry mixing the hydrate pulp used in Example 1 with starch for one minute and then add all acid and water and mix for a further two minutes with high shear. This is the technique that is generally applicable to the production of low to moderate surface area carriers with excellent strength.

Technique B illustrates the importance of the order of mixing when high surface area products are desired. The hydrate pulp is dry mixed for 15 seconds before 80% of the total water is added and the mixture is wet mixed for about 2 minutes under high shear. The acid is then added with the remainder of the water and the mixture is subjected to high shear mixing for a further 25 minutes. When nitric acid was used this mixing resulted in the formation of a slurry-like paste about the consistency of toothpaste. The starch binder is then added with mixing for a further 8 minutes or thereabout. The effect of this addition is to increase the viscosity sufficiently to yield an extrudable mixture. This technique allows the production of a carrier product with moderate to high surface areas while retaining good accompanying physical properties. The relatively modest physical properties of the formic acid peptized product made using Technique B is a reflection of the relatively inefficient degree of peptization achieved by the formic acid.

In each case the mixture was extruded and cut into pellets about 1.6 mm in diameter which were calcined at the same temperature of 350° C. The crush strength of each of the samples prepared as described above is shown in Table 1 below.

TABLE 1

| MIX. TECH. | HNO₃ S.A. m²/gm | HNO₃ C.S. newtons | HCOOH S.A. m²/gm | HCOOH C.S. newtons |
| --- | --- | --- | --- | --- |
| A | 177 | 8.0 | 177 | < 4.5 |
| B | 178 | 16.0 | 171 | < 4.5 |

As can be seen from the above data, the mixing technique has a profound impact on the properties of the final product. Also where high surface areas are needed the better crush strengths are obtained with nitric acid which becomes the acidification medium of choice if the environmental effects can be controlled.

If the same four formulations are fired at a temperature of 950° C. so as to give a low surface area carrier, the properties are as set forth in Table 2 below.

TABLE 2

| MIXING TECHNIQUE | HNO₃ S.A. m²/gm | HNO₃ C.S. newtons | HCOOH S.A. m²/gm | HCOOH C.S. newtons |
| --- | --- | --- | --- | --- |
| A | 3.1 | 132.8 | 3.4 | 117.4 |
| B | 2.5 | 191.7 | 2.3 | 112.1 |

Clearly the mixing technique and the acid strength are less important when low surface area carriers are to be made and in such event the more environmentally acceptable formic acid is usually preferred.

Example 3

This Example indicates the effect of the presence of acid on the abrasion resistance of the finished carrier product. Technique A described in Example 2 was used to produce two carriers from identical formulations except that in one of the formulations formic acid was used and in the other this component was omitted. Pellets formed from extrudates of both were fired at 920° C. to about the same surface area. The properties were as set forth in Table 3 below.

TABLE 3

| PROPERTY | WITH ACID | WITHOUT ACID |
| --- | --- | --- |
| SURFACE AREA m²/gm | 3.2 | 2.3 |
| CRUSH STRENGTH Newtons | 605 | 421.4 |
| ATTRITION % | 0.5 | 0.7 |

As will be seen from the above, the inclusion of acid in the formulation increases both the crush strength and attrition resistance when all other variables are kept more or less unchanged.

What is claimed is:

1. A process for making a titania-based catalyst carrier which comprises:
   a) forming a mixture of titania hydrate pulp having a surface area of at least 150 m²/gm and a loss-on-ignition of from about 15–40% by wt., with from about 1 to about 8% by weight, based on the equivalent titania weight, of an acid;
   b) shaping the mixture in a desired ceramic shape; and thereafter
   c) firing the shaped mixture to form a product with a surface area of less than 200 m²/gm.

2. A process according to claim 1 in which the titania hydrate pulp is compounded with an acid, a temporary binder and enough water to make the mixture extrudable.

3. A process according to claim 2 in which the hydrate pulp is compounded with nitric acid for sufficient time to generate a slurry from the mixture.

4. A process according to claim 1 in which the titania hydrate pulp has a LOI of from about 24 to about 35% by wt.

5. A process according to claim 1 in which the titania hydrate pulp has a surface area of at least about 250 $m^2$/gm.

6. A process according to claim 1 in which the firing is continued till the product has a BET surface area of from about 2 to about 175 $m^2$/gm.

7. A process for making a titania-based catalyst carrier which comprises:

a) forming a mixture of titania hydrate pulp having a surface area of at least 250 $m^2$/gm and a loss-on-ignition of from about 24–35% by wt., with from about 1 to about 8% by weight, based on the equivalent titania weight, of nitric acid;

b) compounding the hydrate pulp with the acid with high shear for a time sufficient to generate a slurry from the mixture;

c) adding a temporary binder material with further mixing;

d) shaping the mixture into a desired ceramic shape; and then e) firing the shaped mixture to form a titania-based carrier product with a surface area of from about 15 $m^2$/gm to less than about 200 $m^2$/gm.

8. A titania-based catalyst carrier prepared by a process according to claim 1 having a surface area of from about 100 to about 175 $m^2$/gm.

9. A titania-based catalyst carrier prepared by a process according to claim 1 having a surface area of from about 15 to about 95 $m^2$/gm.

10. A titania-based catalyst carrier prepared by a process according to claim 1 having a surface area of from about 2 to about 8 $m^2$/gm.

11. A titania-based catalyst carrier prepared by a process according to claim 7 having a surface area of from about 100 to about 175 $m^2$/gm.

12. A titania-based catalyst carrier prepared by a process according to claim 7 having a surface area of from about 15 to about 95 $m^2$/gm.

\* \* \* \* \*